US012194727B2

(12) United States Patent
Muramatsu

(10) Patent No.: US 12,194,727 B2
(45) Date of Patent: Jan. 14, 2025

(54) WEB PRINTING APPARATUS AND WEB PRINTING METHOD

(71) Applicant: SCREEN HOLDINGS CO., LTD., Kyoto (JP)

(72) Inventor: Asuka Muramatsu, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 208 days.

(21) Appl. No.: 18/012,560

(22) PCT Filed: Aug. 20, 2021

(86) PCT No.: PCT/JP2021/030538
§ 371 (c)(1),
(2) Date: Dec. 22, 2022

(87) PCT Pub. No.: WO2022/044987
PCT Pub. Date: Mar. 3, 2022

(65) Prior Publication Data

US 2023/0234372 A1 Jul. 27, 2023

(30) Foreign Application Priority Data

Aug. 26, 2020 (JP) ................................ 2020-142499

(51) Int. Cl.
*B41J 11/00* (2006.01)
*B41J 3/60* (2006.01)

(52) U.S. Cl.
CPC ........... *B41J 11/00212* (2021.01); *B41J 3/60* (2013.01); *B41J 11/008* (2013.01); *B41J 2203/01* (2020.08)

(58) Field of Classification Search
CPC ...... B41J 11/00212; B41J 3/60; B41J 11/008; B41J 2203/01
See application file for complete search history.

(56) References Cited

U.S. PATENT DOCUMENTS

2011/0134178 A1 6/2011 Chiwata
2013/0228969 A1* 9/2013 Nakura .............. G03G 21/1647 271/272

(Continued)

FOREIGN PATENT DOCUMENTS

JP 2003-173109 A 6/2003
JP 3630979 B2 3/2005

(Continued)

OTHER PUBLICATIONS

International Search Report issued in corresponding International Patent Application No. PCT/JP2021/030538, dated Nov. 2, 2021, with English translation.

(Continued)

*Primary Examiner* — Justin Seo
(74) *Attorney, Agent, or Firm* — Rimon P.C.

(57) ABSTRACT

The ratios (Wp1/Wm1, Wp2/Wm2) of the pattern widths Wp1, Wp2 to the paper widths Wm1, Wm2 are obtained, respectively, after the first drying and after the second drying (Step S109). Then, in accordance with these ratios, a range (in other words, the width) in which the back print image G2 is to be printed is adjusted in the width direction Aw (Step S204). As a result, when the double-sided printing is performed on the continuous form paper M by performing drying every time when the image is printed on each of the surfaces Ma, Mb of the continuous form paper M, it is possible to suppress the difference in the ratios of the widths of the images G1, G2 to the width of the continuous form paper M between the surfaces Ma and Mb of the continuous form paper M.

10 Claims, 9 Drawing Sheets

(56) References Cited

U.S. PATENT DOCUMENTS

| | | | |
|---|---|---|---|
| 2013/0321512 | A1 | 12/2013 | Chen et al. |
| 2021/0221152 | A1 | 7/2021 | Takahashi |

FOREIGN PATENT DOCUMENTS

| | | | |
|---|---|---|---|
| JP | 2006-091424 | A | 4/2006 |
| JP | 2009-113323 | A | 5/2009 |
| JP | 5503952 | B2 | 5/2014 |
| JP | 2018-075819 | A | 5/2018 |
| JP | 6539361 | B2 | 7/2019 |
| WO | 2020/059552 | A1 | 3/2020 |

OTHER PUBLICATIONS

Decision to Grant received in corresponding Japanese Patent Application No. 2020-142499, dated Aug. 27, 2024, w/ English Translation.

* cited by examiner

FIG. 5

| MARK KT (n) | POSITION INFORMAITON L (n) |
|---|---|
| Kt (1) | L (1) |
| Kt (2) | L (2) |
| Kt (3) | L (3) |
| Kt (4) | L (4) |
| Kt (5) | L (5) |
| Kt (6) | L (6) |
| Kt (7) | L (7) |
| Kt (8) | L (8) |
| Kt (9) | L (9) |
| Kt (10) | L (10) |

WEB PRINTING APPARATUS AND WEB PRINTING METHOD

CROSS REFERENCE TO RELATED APPLICATIONS

This application is the U.S. National Phase under 35 U.S.C. § 371 of International Application No. PCT/JP2021/030538, filed on Aug. 20, 2021, which claims the benefit of Japanese Application No. 2020-142499, filed on Aug. 26, 2020, the entire contents of each are hereby incorporated by reference.

TECHNICAL FIELD

The present invention relates to a technique for printing an image on both surfaces of a web.

BACKGROUND

As shown in Patent Documents 1 to 3, well known is a web printing apparatus for printing an image on each of both surfaces of a web while transferring the web such as continuous form paper or the like in a roll-to-roll manner. Particularly, the web printing apparatus shown in Patent Document 3 includes a drying part for drying the web. Specifically, after printing an image on a front surface of the web, the web is dried, and then after printing an image on a back surface of the web, the web is dried.

CITATION LIST

Patent Literature

[Patent Document 1] Patent Publication No. 3630979
[Patent Document 2] Patent Publication No. 5503952
[Patent Document 3] Patent Publication No. 6539361

SUMMARY

Technical Problem

There are some cases where the width of the web is expanded or contracted through two drying operations and the image on the front surface of the web and the image on the back surface of the web deviate from each other. Since expansion or contraction in the width of the web does not necessarily occur in the same manner in the two drying operations, particularly, the ratio of the image occupied in the web in a width direction may differ between after the first drying and after the second drying. Thus, the deviation in the ratio of the width of the image to the width of the web between front and back makes it hard to suppress the deviation between the image on the front and the image on the back.

The present invention is intended to solve the above problem, and it is an object of the present invention to provide a technique used when double-sided printing is performed on a web by performing drying every time when an image is printed on each of surfaces of the web, for making it possible to suppress a difference in the ratio of a width of the image to a width of the web between both the surfaces of the web.

Solution to Problem

A web printing apparatus according to the invention, comprises: a first printing part that prints a first image on a first surface of a web having a width in a width direction; a first drying part that dries the web by heating the web on which the first image is printed by the first printing part; a second printing part that prints a second image on a second surface opposite to the first surface of the web dried by the first drying part; a second drying part that dries the web by heating the web on which the second image is printed by the second printing part; a first image pickup part that images the first surface of the web after being dried by the first drying part and before being dried by the second drying part; a second image pickup part that images the second surface of the web after being dried by the second drying part; and a control part that prints a first test pattern on the first surface by the first printing part and prints a second test pattern on the second surface by the second printing part, wherein the first image pickup part acquires a first pickup image by imaging the first surface on which the first test pattern is printed, the second image pickup part acquires a second pickup image by imaging the second surface on which the second test pattern is printed, and the control part obtains a first ratio indicating a ratio of a first size reflecting a size of the first test pattern in the width direction to the width of the web on the basis of the first pickup image, obtains a second ratio indicating a ratio of a second size reflecting a size of the second test pattern in the width direction to the width of the web on the basis of the second pickup image, and adjusts the width of at least one of the first image and the second image in the width direction in accordance with the first ratio and the second ratio.

A web printing method according to the invention comprises: printing a first test pattern on a first surface of a web having a width in a width direction by a first printing part; drying the web by using a first drying part to heat the web on which the first test pattern is printed by the first printing part; printing a second test pattern, by a second printing part, on a second surface opposite to the first surface of the web dried by the first drying part: drying the web by using a second drying part to dry the web on which the second test pattern is printed by the second printing part; acquiring a first pickup image by imaging the web on which the first test pattern is printed, after being dried by the first drying part and before being dried by the second drying part; acquiring a second pickup image by imaging the web on which the second test pattern is printed, after being dried by the second drying part; obtaining a first ratio indicating a ratio of a first size reflecting a size of the first test pattern in the width direction to the width of the web on the basis of the first pickup image; obtaining a second ratio indicating a ratio of a second size reflecting a size of the second test pattern in the width direction to the width of the web on the basis of the second pickup image; adjusting a range in the width direction, in which at least one of a first image and a second image is printed in accordance with the first ratio and the second ratio; printing the first image on the first surface of the web by the first printing part; drying the web by using the first drying part to heat the web on which the first image is printed by the first printing part; printing the second image on the second surface of the web which is dried by the first drying part; and drying the web by using the second drying part to dry the web on which the second image is printed by the second printing part.

In the present invention (the web printing apparatus and the web printing method) having such a configuration, double-sided printing is performed by printing the first image on the first surface of the web and printing the second image on the second surface of the web. Further, prior to the double-sided printing, printing of the first and second test patterns is performed. In detail, the first test pattern is printed on the first surface of the web and then drying is performed, and further the second test pattern is printed on the second surface of the web and then drying is performed. At that time, the first pickup image is acquired by imaging the first surface on which the first test pattern is printed, and the second pickup image is acquired by imaging the second surface on which the second test pattern is printed. Furthermore, the first ratio indicating the ratio of the first size reflecting the size of the first test pattern in the width direction to the width of the web is obtained on the basis of the first pickup image. Further, the second ratio indicating the ratio of the second size reflecting the size of the second test pattern in the width direction to the width of the web is obtained on the basis of the second pickup image.

In other words, the ratio of the size of the test pattern to the width of the web is obtained after the first drying and after the second drying (the first ratio and the second ratio). Then, in accordance with the first ratio and the second ratio, a range in which at least one of the first image and the second image is to be printed is adjusted in the width direction. As a result, when the double-sided printing is performed on the web by performing drying every time when the image is printed on each surface of the web, it is possible to suppress the difference in the ratio of the width of the image to the width of the web between both the surfaces of the web.

Further, adjustment of the range in which at least one of the first image and the second image is to be printed may be performed by an appropriate method. For example, it may be executed by elongating or contracting a width of at least one of the first image and the second image in accordance with the first ratio and the second ratio.

The web printing apparatus may be configured so that the control part adjusts the width of at least one of the first image and the second image in the width direction so that a ratio of a width of the first image to a width of the web after being dried by the first drying part and before being dried by the second drying part and a ratio of a width of the second image to a width of the web after being dried by the second drying part coincide with each other. In such a configuration, it is possible to reliably suppress the difference in the ratio of the width of the image to the width of the web between both the surfaces of the web.

The web printing apparatus may be configured so that the control part transmits test data which are data indicating a test pattern to the first printing part and the second printing part, the first printing part prints the first test pattern by printing an image indicated by the test data, and the second printing part prints the second test pattern by printing an image indicated by the test data. In such a configuration, the first test pattern and the second test pattern are printed on the basis of the same test data. Therefore, it is possible to suppress the difference between the first test pattern and the second test pattern from being caused by any factor other than the expansion or contraction of the web. In other words, the influence of the expansion or contraction of the web can be precisely reflected on the difference between the first test pattern and the second test pattern. As a result, it is possible to reliably suppress the difference in the ratio of the width of the image to the width of the web between both the surfaces of the web.

The web printing apparatus may be configured so that the first test pattern has a plurality of first marks arranged in the width direction, the second test pattern has a plurality of second marks arranged in the width direction, and the control part obtains a distance of two first marks in the width direction, among the plurality of first marks included in the first pickup image, as the first size and obtains a distance of two second marks in the width direction, among the plurality of second marks included in the second pickup image, as the second size. In such a configuration, by simple calculation of obtaining the distance of the two marks in the width direction, it is possible to obtain the first and second sizes reflecting the sizes of the first and second test patterns, respectively.

At that time, there are various manners of selecting two marks out of the plurality of marks (the first and second marks) of the test patterns (the first and second test patterns). For example, the web printing apparatus may be configured so that the control part obtains a distance in the width direction of two first marks positioned at both ends among the plurality of first marks, as the first size and obtains a distance in the width direction of two second marks positioned at both ends among the plurality of second marks, as the second size.

The web printing apparatus may be configured so that when the width of the web on which the first image and the second image are planned to be printed is changed from the width of the web on which the first test pattern and the second test pattern are printed, the control part obtains a distance in the width direction of two first marks positioned at both ends in a range within the changed width of the web, among the plurality of first marks, as the first size and obtains a distance in the width direction of two second marks positioned at both ends in a range within the changed width of the web, among the plurality of second marks, as the second size. In such a configuration, it is possible to suppress the difference in the ratio of the width of the image to the width of the web between both the surfaces of the web while precisely dealing with the change in the width of the web.

On this occasion, the web printing apparatus may be configured so that the first printing part has a plurality of first heads arranged in the width direction and ejects ink from the first heads, to thereby print the first image, the second printing part has a plurality of second heads arranged in the width direction and ejects ink from the second heads, to thereby print the second image, and the control part uses the plurality of first heads to print the plurality of first marks, respectively, by causing each of the plurality of first heads to eject ink and uses the plurality of second heads to print the plurality of second marks, respectively, by causing each of the plurality of second heads to eject ink.

The web printing apparatus may be configured so that the control part adjusts a position of at least one of the first image and the second image in the width direction in accordance with a difference between a distance of an end of the web and the first test pattern in the width direction which is obtained on the basis of the first pickup image and a distance of an end of the web and the second test pattern in the width direction which is obtained on the basis of the second pickup image. In such a configuration, it is possible to print an image on each of both the surfaces of the web while suppressing not only the difference in the ratio of the width of the image to the width of the web but also the position deviation of the image in the width direction of the web.

The web printing apparatus may be configured so that the first test pattern has a plurality of first offset marks arranged in an orthogonal direction orthogonal to the width direction, the second test pattern has a plurality of second offset marks arranged in the orthogonal direction, corresponding to the plurality of first offset marks, respectively, a distance to the end of the web in the width direction differs depending on each of the plurality of first offset marks, a distance to the end of the web in the width direction differs depending on each of the plurality of second offset marks, and the control part adjusts a position of at least one of the first image and the second image in the width direction in accordance with an average value of a differences between a distance of the first offset mark and the end of the web and a distance of the corresponding second offset mark and the end of the web, the differences being calculated for respective combinations of the first offset marks and the corresponding second offset marks. In such a configuration, it is possible to print an image on each of both surfaces of the web while reliably suppressing the position deviation of the image in the width direction of the web.

Advantageous Effects of Invention

As described above, according to the present invention, when double-sided printing is performed on a web by performing drying every time when an image is printed on each surface of the web, it is possible to suppress a difference in the ratio of a width of the image to a width of the web between both the surfaces of the web.

BRIEF DESCRIPTION OF DRAWINGS

FIG. 5 is a view showing exemplary information acquired in the scaling adjustment value preparation process of FIG. 3 in a table format;

DESCRIPTION OF EMBODIMENT

Figure 1:
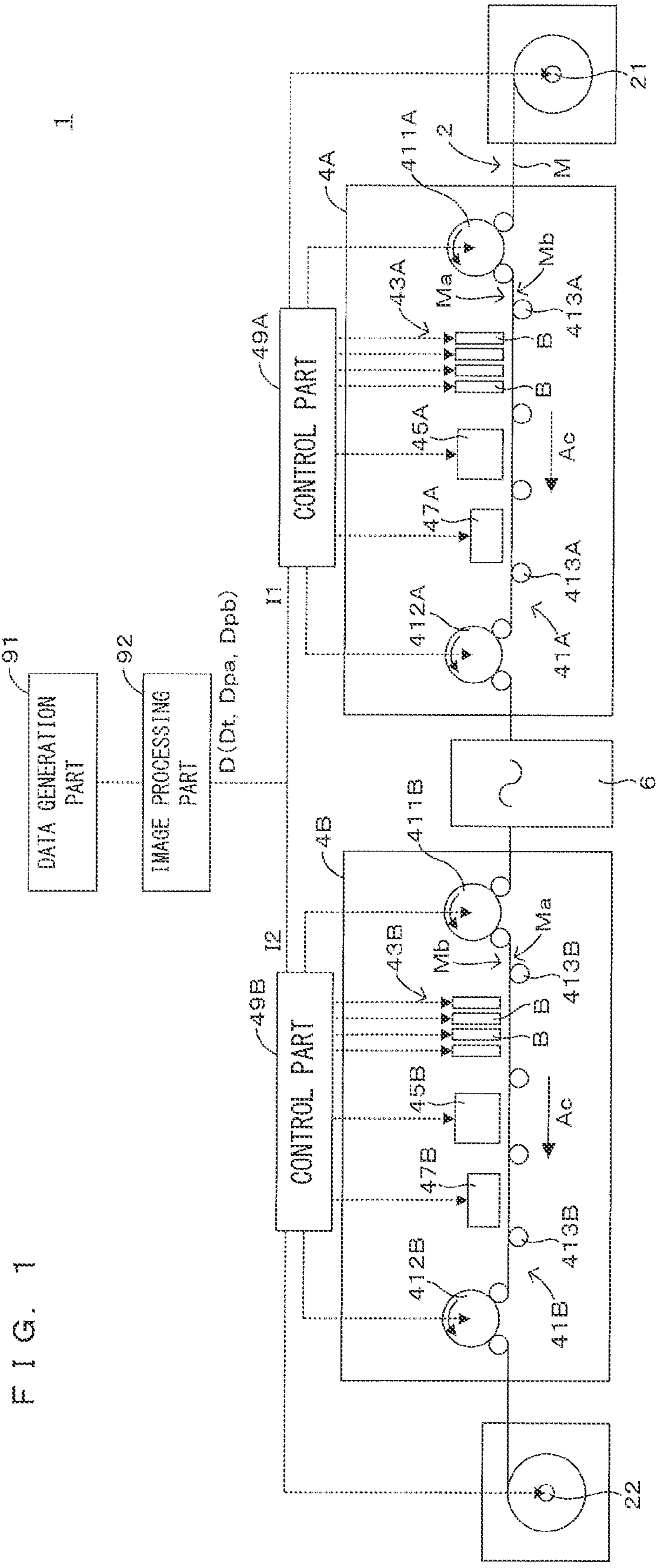
FIG. 1 is an elevational view schematically showing a continuous paper printer as an example of a web printing apparatus in accordance with the present invention.

FIG. 1 is an elevational view schematically showing a continuous paper printer as an example of a web printing apparatus in accordance with the present invention. This continuous paper printer 1 prints an image by ejecting water-based ink onto continuous form paper M by an inkjet method. The continuous form paper M has a front surface Ma and a back surface Mb opposite to the front surface Ma, and the continuous paper printer 1 performs double-sided printing in which an image is printed on both of surfaces Ma, Mb of the continuous form paper M.

The continuous paper printer 1 includes a transfer part 2 that transfers the continuous form paper M in a transfer direction Ac going from right toward left of FIG. 1. This transfer part 2 has a feed-out roller 21 and a winding roller 22, and one end portion of the continuous form paper M is wound around the feed-out roller 21 and the other end portion of the continuous form paper M is wound around the winding roller 22. Then, the feed-out roller 21 feeds out the continuous form paper M and the winding roller 22 winds up the continuous form paper M therearound, to thereby transfer the continuous form paper M in a roll-to-roll manner.

Further, the continuous paper printer 1 includes a front surface printer 4A and a back surface printer 4B arranged between the feed-out roller 21 and the winding roller 22. In the transfer direction Ac, the front surface printer 4A is positioned on the upstream side and the back surface printer 4B is positioned on the downstream side. For this reason, the continuous form paper M transferred by the transfer part 2 goes through the front surface printer 4A and then goes through the back surface printer 4B. The front surface printer 4A prints an image on the front surface Ma of the continuous form paper M, and the back surface printer 4B prints an image on the back surface Mb of the continuous form paper M. Thus, the front surface printer 4A and the back surface printer 4B includes almost common constituent elements except that printing is made on different surfaces Ma, Mb. For this reason, description will be made, centering on the front surface printer 4A, and description of the back surface printer 4B will be omitted as appropriate, with corresponding reference signs.

The front surface printer 4A has a transfer part 41A that transfers the continuous form paper M in the transfer direction Ac. The transfer part 41A has a driving roller 411A, a driving roller 412A disposed on the downstream side of the driving roller 411A in the transfer direction Ac, and a plurality of driven rollers 413A arranged between the driving roller 411A and the driving roller 412A. The driving rollers 411A, 412A drive the continuous form paper M in the transfer direction Ac and the driven rollers 413A rotate, following the continuous form paper M.

The front surface printer 4A has a printing part 43A disposed between the driving roller 411A and the driving roller 412A in the transfer direction Ac, and the printing part 43A faces the continuous form paper M from above. The printing part 43A has a plurality of (four) print bars B arranged in the transfer direction Ac, and the plurality of print bars B eject inks of respective different colors (yellow, cyan, magenta, and black) onto the continuous form paper M. Thus, a color image is printed on the continuous form paper M. Further, the number of print bars B and the colors of the inks ejected from the print bars B are not limited to this example described herein.

Furthermore, the front surface printer 4A has a drying part 45A disposed between the printing part 43A and the driving roller 412A in the transfer direction Ac. Thus, the drying part 45A disposed on the downstream side of the printing part 43A in the transfer direction Ac dries the continuous form paper M on which the image is printed by the printing part 43A. Specifically, the drying part 45A dries the continuous form paper M by heating the continuous form paper M by hot air, a heater, or the like.

Further, the front surface printer 4A has an image pickup part 47A disposed between the drying part 45A and the driving roller 412A in the transfer direction Ac, and the image pickup part 47A faces the continuous form paper M from above. Thus, the image pickup part 47A disposed on the downstream side of the printing part 43A and the drying part 45A in the transfer direction Ac picks up the image printed on the continuous form paper M by imaging the continuous form paper M on which the image is printed by the printing part 43A, which is dried by the drying part 45A. This image pickup part 47A is used, for example, for quality inspection (inspection on whether there is a dead pixel or not, or the like) of the printed image or front-and-back scaling adjustment described later.

This front surface printer 4A has a control part 49A that controls the printing part 43A, the drying part 45A, and the image pickup part 47A. Specifically, the control part 49A controls ejection of the ink from each of the print bars B of the printing part 43A on the basis of print data D indicating an image to be printed, to thereby print the image indicated by the print data D on the continuous form paper M. Further, the control part 49A acquires a pickup image by causing the image pickup part 47A to image the continuous form paper M and the image printed on the continuous form paper M.

Furthermore, the continuous paper printer 1 includes a reversing machine 6 provided between the front surface printer 4A and the back surface printer 4B each including the above-described configuration. This reversing machine 6 has a function of reversing the front surface Ma and the back surface Mb of the continuous form paper M, and the continuous form paper M unloaded from the front surface printer 4A, with the front surface Ma facing upward, is reversed by the reversing machine 6 and then is loaded into the back surface printer 4B. Therefore, the continuous form paper M with the back surface Mb facing upward is loaded into the back surface printer 4B. In the continuous paper printer 1 as described above, the front surface printer 4A performs printing of an image on the front surface Ma of the continuous form paper M, drying, and image pickup of the front surface Ma of the continuous form paper M, and the back surface printer 4B performs printing of an image on the back surface Mb of the continuous form paper M, drying, and image pickup of the back surface Mb of the continuous form paper M.

Further, the continuous paper printer 1 has a data generation part 91 and an image processing part 92. The data generation part 91 generates data (e.g., data in a portable document format (PDF)) indicating a tone value of each pixel in multitone (for example, 256 tones), and the image processing part 92 serving as a RIP (Raster Image Processor) that rasterizes the data generated by the data generation part 91, to thereby generate print data D. The print data D generated thus are binary data representing the value of each pixel in binary. The data generation part 91 and the image processing part 92 are provided common to the front surface printer 4A and the back surface printer 4B, and generate print data Dpa indicating a print image for the front surface printer 4A and transmit the print data Dpa to the control part 49 of the front surface printer 4A and also generate print data Dpb indicating a print image for the back surface printer 4B and transmit the print data Dpb to the control part 49 of the back surface printer 4B.

Furthermore, as described above, the continuous paper printer 1 includes various arithmetic units such as the control part 49, the data generation part 91, and the image processing part 92. The data generation part 91 is formed of, for example, a personal computer, and the image processing part 92 and the control part 49 are each formed of, for example, a processor, an FPGA (Field Programmable Gate Array), or the like.

Figure 2:
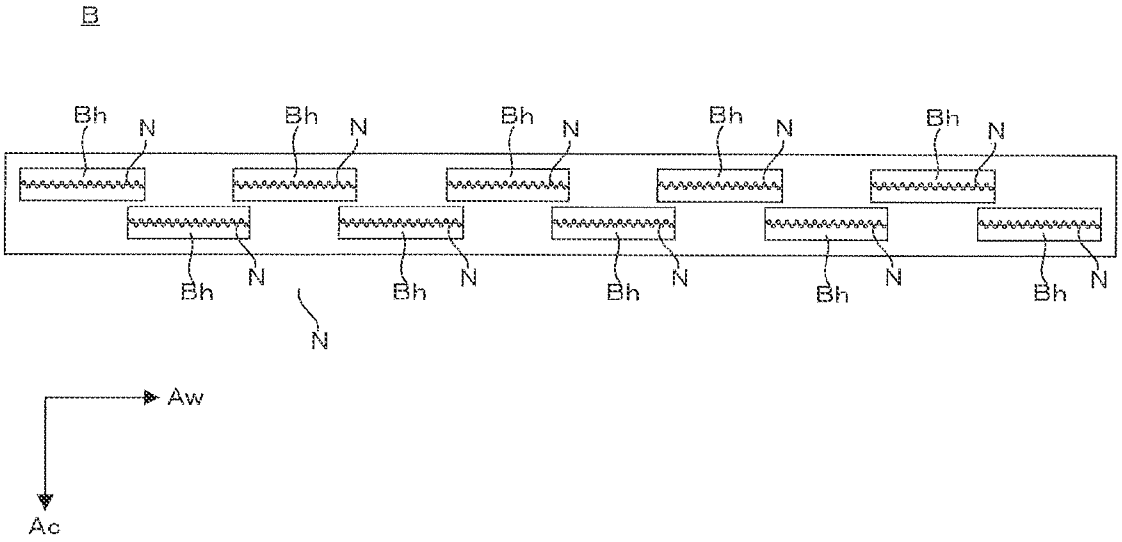
FIG. 2 is a bottom view schematically showing a configuration of a print bar included in each of a front surface printer and a back surface printer.

FIG. 2 is a bottom view schematically showing a configuration of the print bar included in each of the front surface printer and the back surface printer. Further, since the plurality of print bars B included in the front surface printer 4A and the plurality of print bars B included in the back surface printer 4B each have a common configuration, description will be made on one print bar B.

On a bottom surface of the print bar B, a plurality of (ten) print heads Bh are disposed in a two-row staggered arrangement in a width direction Aw of the continuous form paper M. Herein, the width direction Aw is orthogonal to the transfer direction Ac. Each of the print heads Bh has a plurality of nozzles N arranged in the width direction Aw. Each of the nozzles N faces the continuous form paper M and ejects ink onto the continuous form paper M by an inkjet method. Further, the number of print heads Bh and the arrangement manner of the print heads Bh are not limited to those shown in the exemplary case of FIG. 2.

The continuous paper printer 1 adjusts respective magnifications of the image to be printed on the front surface Ma and the image to be printed on the back surface Mb (front-and-back scaling adjustment) so that the image printed on the front surface Ma and the image printed on the back surface Mb coincide with each other, in other words, overlap each other. Specifically, the front-and-back scaling adjustment is performed by obtaining adjustment values (a scaling value and an offset value) required for the front-and-back scaling adjustment (scaling adjustment value preparation process) and then generating the respective print data D (Dpa and Dpb) of the front and the back on the basis of these adjustment values. Subsequently, this process will be described.

Figure 3:
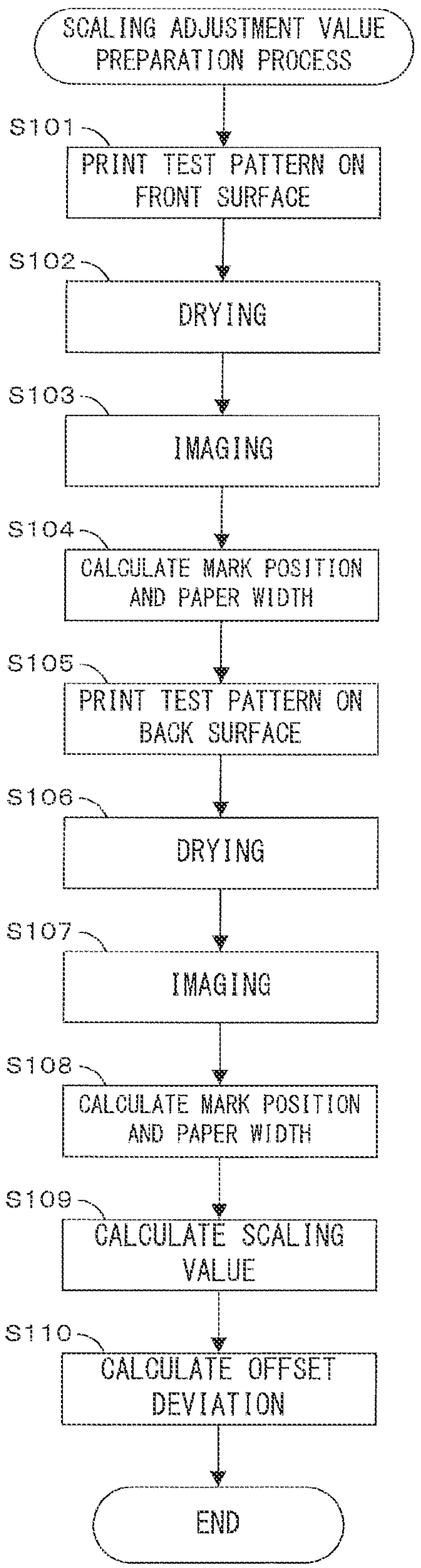
FIG. 3 is a flowchart showing an exemplary scaling adjustment value preparation process.
Figure 4:
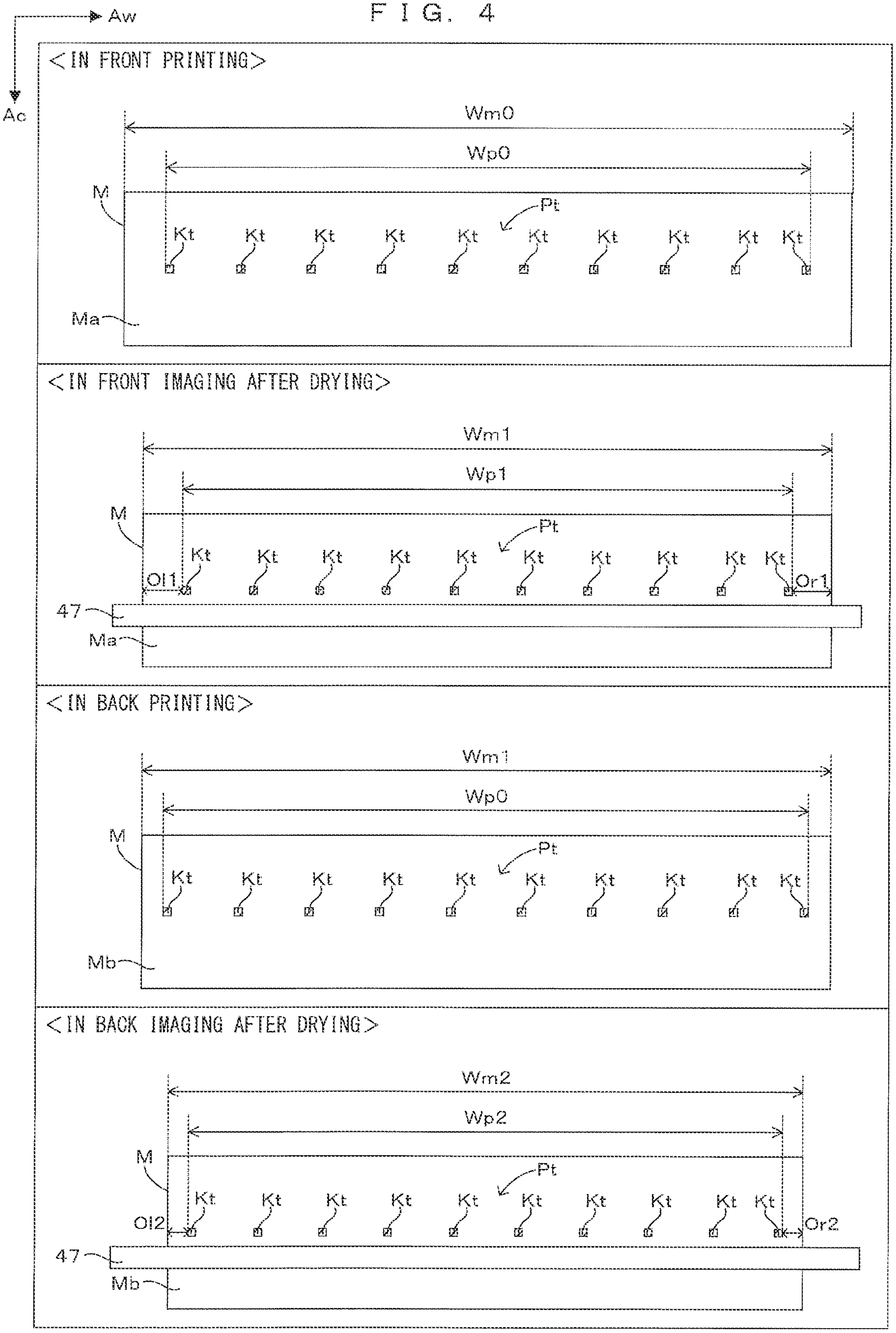
FIG. 4 is a view schematically showing operations performed in the scaling adjustment value preparation process of FIG. 3.

FIG. 3 is a flowchart showing an exemplary scaling adjustment value preparation process, FIG. 4 is a view schematically showing operations performed in the scaling adjustment value preparation process of FIG. 3, and FIG. 5 is a view showing exemplary information acquired in the scaling adjustment value preparation process of FIG. 3 in a table format. Further, in a relation of sizes shown in FIG. 4, the difference is emphasized as compared with the actual difference. The scaling adjustment value preparation process shown in FIG. 3 is performed by the data generation part 91, the image processing part 92, the control part 49A, and the control part 49B in cooperation. Further, the flowchart of FIG. 3 is executed for each of the plurality of colors (yellow, cyan, magenta, and black) which can be printed by the front surface printer 4A and the back surface printer 4B. Since processing details are common to all the colors, however, a processing for one color will be described herein.

In Step S101, a test pattern Pt is printed on the front surface Ma of the continuous form paper M. As shown in the field of "In Front Printing" of FIG. 4, for example, the test pattern Pt has a plurality of marks Kt arranged at regular intervals in the width direction Aw. Specifically, since each of the plurality of print heads Bh of the print bar B prints one mark Kt, the plurality of (ten) print heads Bh print the plurality of (ten) marks Kt, respectively. These plurality of marks Kt have the same shape and size.

In detail, the data generation part 91 generates data indicating the test pattern Pt and transmits the data to the image processing part 92. The image processing part 92 rasterizes the received data, to thereby generate test print data Dt which are print data D indicating the test pattern Pt. The test print data Dt are transmitted from the image processing part 92 to the control part 49A of the front surface printer 4A. Then, the front surface printer 4A performs printing on the basis of the test print data Dt received by the control part 49A, to thereby print the test pattern Pt shown in the field of "In Front Printing" of FIG. 4 on the front surface Ma of the continuous form paper M.

As shown in the field of "In Front Printing" of FIG. 4, in printing performed by the printing part 43A of the front surface printer 4A, the continuous form paper M has a paper width Wm0 in the width direction Aw. Further, the test pattern Pt has a pattern width Wp0 in the width direction Aw. Herein, the pattern width Wp0 is given as a distance of two marks Kt positioned at both ends in the width direction Aw, out of the plurality of marks Kt included in test pattern Pt. At that time, the distance of the two marks Kt is a distance between respective outer ends of the two marks Kt, and with reference to FIG. 4, the distance is a distance between a right end of the right mark Kt and a left end of the left mark Kt. Hereinafter, the distance between the two marks Kt, which gives the width of the test pattern Pt, can be obtained in the same manner.

In the front surface printer 4A, the continuous form paper M with its front surface Ma on which the test pattern Pt is printed is transferred in the transfer direction Ac and dried by the drying part 45A (Step S102). Further, the continuous form paper M dried by the drying part 45A is transferred in the transfer direction Ac and passes below the image pickup part 47A. The image pickup part 47A is a line camera disposed in parallel with the width direction Aw and repeats an operation of picking up an image of the continuous form paper M passing therebelow line by line, in synchronization with the transfer of the continuous form paper M, to thereby pick up a two-dimensional image of the continuous form paper M. This image pickup part 47A is wider than the paper width Wm0 in the width direction Aw and can pick up an image of the whole of the continuous form paper M in the width direction Aw.

Therefore, when the test pattern Pt passes below the image pickup part 47A, the test pattern Pt and the front surface Ma of the continuous form paper M on which the test pattern Pt is printed are imaged by the image pickup part 47A and a front pickup image I1 is thereby acquired (Step S103). This front pickup image I1 is transmitted from the image pickup part 47A to the control part 49A. The control part 49A performs image processing on the front pickup image I1, to thereby calculate the scaling value, and transmits the calculated scaling value to the image processing part 92. Details of the scaling value will be described later.

In the front surface printer 4A, the continuous form paper M is dried by the drying part 45A before being imaged by the image pickup part 47A and is contracted in the width direction Aw. Therefore, as shown in the field of "In Front Imaging After Drying" of FIG. 4, in picking up an image by the image pickup part 47A of the front surface printer 4A, the continuous form paper M has a paper width Wm1 smaller than the paper width Wm0 in the width direction Aw. Further, the test pattern Pt has a pattern width Wp1 smaller than the pattern width Wp0 in the width direction Aw.

In Step S104, the control part 49A extracts an image of the test pattern Pt from the front pickup image I1 and acquires position information (FIG. 5) of the plurality of marks Kt included in the test pattern Pt. Specifically, as shown in FIG. 5, acquired are ten pieces of position information L(n) (n=1 to 10) corresponding to the ten marks Kt(n). The position information L includes, for example, at least some of the position (the position of geometric center of gravity, the position of an end in the width direction Aw, or the like), the shape, the size, or the like of the corresponding mark Kt. Further, in Step S104, the control part 49A extracts an image of the continuous form paper M from the front pickup image I1 and obtains the paper width Wm1 of the continuous form paper M in the transfer direction Ac.

In Step S105, a test pattern Pt is printed on the back surface Mb of the continuous form paper M. Specifically, the test print data Dt used for printing the test pattern Pt on the front surface Ma of the continuous form paper M are transmitted from the image processing part 92 to the control part 49B of the back surface printer 4B. Then, the back surface printer 4B performs printing on the basis of the test print data Dt received by the control part 49B, to thereby print the test pattern Pt shown in the field of "In Back Printing" of FIG. 4 on the back surface Mb of the continuous form paper M. In other words, each of the plurality of print heads Bh of the print bar B prints one mark Kt, printed is the test pattern Pt having the plurality of marks Kt arranged at regular intervals in the width direction Aw.

As shown in the field of "In Back Printing" of FIG. 4, in printing performed by the printing part 43B of the back surface printer 4B, the continuous form paper M has the paper width Wm1 in the width direction Aw. Further, the test pattern Pt has the pattern width Wp0 in the width direction Aw.

In the back surface printer 4B, the continuous form paper M with its back surface Mb on which the test pattern Pt is printed is transferred from the drying part 45B in the transfer direction Ac and dried by the drying part 45B (Step S106). Further, the continuous form paper M dried by the drying part 45B is transferred in the transfer direction Ac and passes below the image pickup part 47B. Then, when the test pattern Pt passes below the image pickup part 47B, the test pattern Pt and the back surface Mb of the continuous form paper M on which the test pattern Pt is printed are imaged by the image pickup part 47B and a back pickup image I2 is thereby acquired (Step S107). This back pickup image I2 is transmitted from the image pickup part 47B to the control part 49B.

In the back surface printer 4B, the continuous form paper M is dried by the drying part 45B before being imaged by the image pickup part 47B and is further contracted in the width direction Aw. Therefore, as shown in the field of "In Back Imaging After Drying" of FIG. 4, in picking up an image by the image pickup part 47B of the back surface printer 4B, the continuous form paper M has a paper width Wm2 smaller than the paper width Wm1 in the width direction Aw. Further, the test pattern Pt has a pattern width Wp2 smaller than the pattern width Wp0 in the width direction Aw.

In Step S108, the control part 49B extracts an image of the test pattern Pt from the back pickup image I2 and acquires position information (FIG. 5) of the plurality of marks Kt included in the test pattern Pt. Further, in Step S108, the control part 49B extracts an image of the continuous form paper M from the back pickup image I2 and obtains the paper width Wm2 of the continuous form paper M in the transfer direction Ac. Furthermore, in Step S108, the paper width Wm2 of the continuous form paper M and position information of the plurality of marks Kt acquired by the control part 49B are transmitted to the control part 49A.

In Step S109, a scaling value indicating the degree of deviation between the test pattern Pt printed on the front surface Ma and the test pattern Pt printed on the back surface Mb is calculated by the control part 49A. In this embodiment, particularly, not by simple comparison between the front and back test patterns Pt, in consideration of the ratio of the width of the test pattern Pt to the width of the continuous form paper M, the scaling value is calculated. Specifically, the scaling value is calculated by using the following equation:

$$\text{scaling value}=(Wp1/Wm1)/(Wp2/Wm2) \quad \text{(Eq. 1)}$$

where Wp1: the width of the test pattern Pt on the front surface Ma after the first drying, Wm1: the width of the front surface Ma after the first drying, Wp2: the width of the test pattern Pt on the back surface Mb after the second drying, and Wm2: the width of the back surface Mb after the second drying.

Further, the pattern width Wp1 is calculated from the position information L (FIG. 5) of the mark Kt printed on the front surface Ma, and the pattern width Wp is calculated from the position information L (FIG. 5) of the mark Kt printed on the back surface Mb. Furthermore, the control part 49A transmits the scaling value calculated as above to the image processing part 92.

In Step S110, the control part 49A calculates offset deviation. In other words, the control part 49A obtains offsets Or1 and Ol1 of the test pattern Pt printed on the front surface Ma, on the basis of the front pickup image I1. Specifically, a distance in the width direction Aw between one-side (outside) end of the mark Kt positioned at one-side end (on the right side in FIG. 4), among the plurality of marks Kt (the test pattern Pt) printed on the front surface Ma, and one-side end of the continuous form paper M is obtained as one-side offset Or1. Similarly, a distance in the width direction Aw between the other-side (outside) end of the mark Kt positioned at the other-side end (on the left side in FIG. 4), among the plurality of marks Kt (the test pattern Pt) printed on the front surface Ma, and the other-side end of the continuous form paper M is obtained as the other-side offset Ol1.

Further, the control part 49B obtains offsets Or2 and Ol2 of the test pattern Pt printed on the back surface Mb, on the basis of the back pickup image I2. Specifically, a distance in the width direction Aw between one-side (outside) end of the mark Kt positioned at one-side end (on the right side in FIG. 4), among the plurality of marks Kt (the test pattern Pt) printed on the back surface Mb, and one-side end of the continuous form paper M is obtained as one-side offset Or2. Similarly, a distance in the width direction Aw between the other-side (outside) end of the mark Kt positioned at the other-side end (on the left side in FIG. 4), among the plurality of marks Kt (the test pattern Pt) printed on the back surface Mb, and the other-side end of the continuous form paper M is obtained as the other-side offset Ol2. Then, the offsets Or2, Ol2 obtained by the control part 49B are transmitted to the control part 49A.

Then, the control part 49A obtains a difference ΔOr (=Or1−Ol2) between the one-side offset Or1 of the front surface Ma and the one-side offset Ol2 of the back surface Mb as one-side offset deviation and obtains a difference ΔOl (=Ol1−Or2) between the other-side offset Ol1 of the front surface Ma and the other-side offset Or2 of the back surface Mb as the other-side offset deviation. The one-side offset deviation ΔOr and the other-side offset deviation ΔOl obtained by the control part 49A are transmitted from the control part 49A to the image processing part 92. Thus, when the offset deviations ΔOr, ΔOl are obtained, the scaling adjustment value preparation process shown in FIG. 3 is ended.

Figure 6:
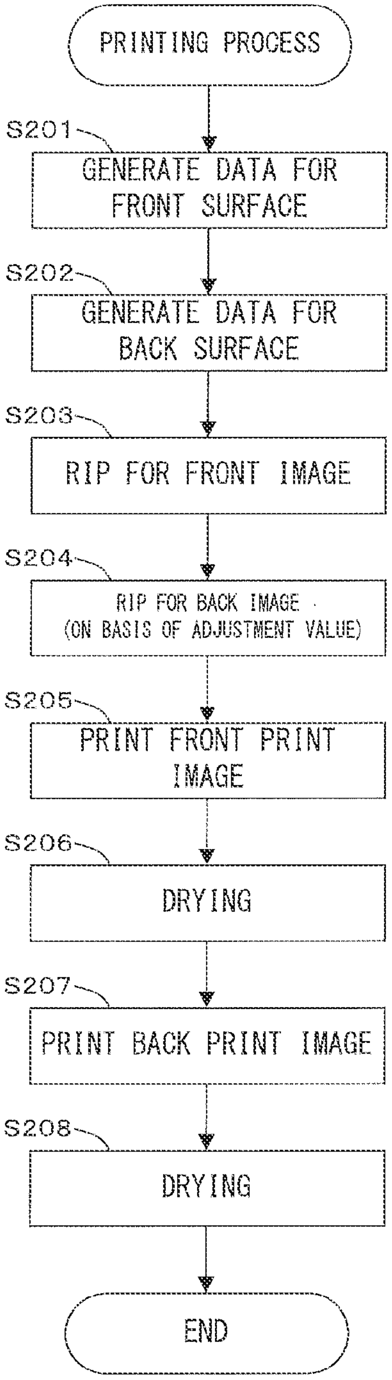
FIG. 6 is a flowchart showing an exemplary printing process performed by the continuous paper printer of FIG. 1.

FIG. 6 is a flowchart showing an exemplary printing process performed by the continuous paper printer of FIG. 1. With the start of the printing process, the data generation part 91 generates data indicating an image to be printed on the front surface Ma (Step S201) and generates data indicating an image to be printed on the back surface Mb (Step S202). Then, the image processing part 92 performs rasterization on the data generated in Step S201, to thereby generate front image print data Dpa (Step S203), and performs rasterization on the data generated in Step S202, to thereby generate back image print data Dpb (Step S204). Especially in Step S204, on the basis of the scaling value (adjustment value) obtained in the scaling adjustment value preparation process, the back image print data Dpb is generated. As to this point, description will be made with reference to FIG. 7.

Figure 7:
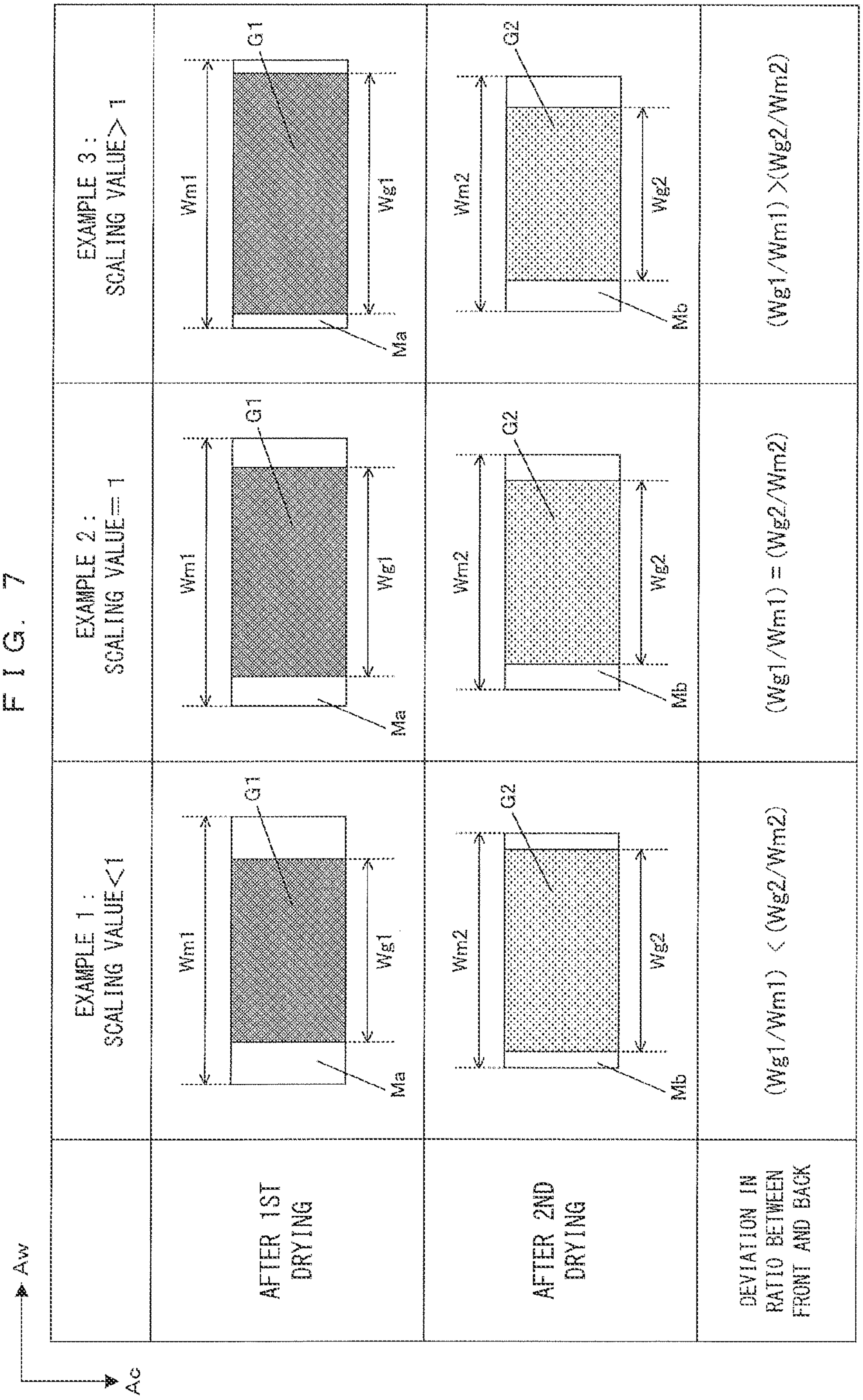
FIG. 7 is a view schematically showing a relation between the width of an image and a scaling value.

FIG. 7 is a view schematically showing a relation between the width of an image and the scaling value. In FIG. 7, Example 1 shows an exemplary case where the printing process is performed in a state where the scaling value (Eq. 1) is smaller than 1, Example 2 shows an exemplary case where the printing process is performed in a state where the scaling value is equal to 1, and Example 3 shows an exemplary case where the printing process is performed in a state where the scaling value is larger than 1.

Further, in the row of "After 1st Drying", shown are the image width Wg1 of the front print image G1 printed on the front surface Ma and the paper width Wm1 of the continuous form paper M immediately after drying using the drying part 45A of the front surface printer 4A (in other words, before drying using the drying part 45B of the back surface printer 4B). Furthermore, in the row of "After 2nd Drying", shown are the image width Wg2 of the back print image G2 printed on the back surface Mb and the paper width Wm2 of the continuous form paper M immediately after drying using the drying part 45B of the back surface printer 4B.

Moreover, in the row of "Deviation in Ratio between Front and Back", shown is a magnitude relation between the ratio (Wg1/Wm1) of the image width Wg1 of the front print image G1 to the paper width Wm1 of the continuous form paper M after the first drying and the ratio (Wg2/Wm2) of the image width Wg2 of the back print image G2 to the paper width Wm2 of the continuous form paper M after the second drying.

In Example 1, reflecting that the scaling value is smaller than 1, (Wg1/Wm1)<(Wg2/Wm2). In other words, the ratio of the image width Wg1 of the front print image G1 occupied in the paper width Wm1 of the continuous form paper M is smaller than the ratio of the image width Wg2 of the back print image G2 occupied in the paper width Wm2 of the continuous form paper M. In such a case, in the continuous form paper M on which the double-sided printing is completed by the continuous paper printer 1, the width of the front print image G1 is smaller than the width of the back print image G2, and the front print image G1 and the back print image G2 cannot overlap each other.

In Example 2, reflecting that the scaling value is equal to 1, (Wg1/Wm1)=(Wg2/Wm2). In other words, the ratio of the image width Wg1 of the front print image G1 occupied in the paper width Wm1 of the continuous form paper M is equal to the ratio of the image width Wg2 of the back print image G2 occupied in the paper width Wm2 of the continuous form paper M. In such a case, in the continuous form paper M on which the double-sided printing is completed by the continuous paper printer 1, since the width of the front print image G1 is equal to the width of the back print image G2, the front print image G1 and the back print image G2 can overlap each other.

In Example 3, reflecting that the scaling value is smaller than 1, (Wg1/Wm1)>(Wg2/Wm2). In other words, the ratio of the image width Wg1 of the front print image G1 occupied in the paper width Wm1 of the continuous form paper M is smaller than the ratio of the image width Wg2 of the back print image G2 occupied in the paper width Wm2 of the continuous form paper M. In such a case, in the continuous form paper M on which the double-sided printing is completed by the continuous paper printer 1, the width of the front print image G1 is larger than the width of the back print image G2, and the front print image G1 and the back print image G2 cannot overlap each other.

Then, in Step S204 of the printing process (FIG. 6), the image processing part 92 adjusts the back image print data Dpb so that (Wg1/Wm1)=(Wg2/Wm2) can be achieved at the point in time when the double-sided printing is completed (in other words, after the second drying). Specifically, on the basis of the scaling value obtained in the scaling adjustment value preparation process, the width of the image indicated by the back image print data Dpb is adjusted to the width of the image indicated by the front image print data Dpa (scaling adjustment).

Further, in Step S204, on the basis of the offset deviation (adjustment value) obtained in the scaling adjustment value preparation process, performed is offset adjustment for adjusting the position of the image indicated by the back image print data Dpb in the width direction Aw. In other words, the back print image G2 is shifted with respect to the front print image G1 in the width direction Aw by using ΔOr as an offset value when the reference of image data is on the Or side, or by using ΔOl as an offset value when the reference of the image data is on the Ol side. Then, in accordance with this offset value, the position of the image indicated by the back image print data Dpb is shifted in the width direction Aw. Thus, in Step S204, the back image print data Dpb is generated while the scaling adjustment and the offset adjustment are performed.

Then, the front image print data Dpa are transmitted to the control part 49A of the front surface printer 4A, and in the front surface printer 4A, the printing part 43A ejects ink on the basis of the front image print data Dpa, to thereby print the front print image G1 on the front surface Ma of the continuous form paper M (Step S205). Further, in the front surface printer 4A, the continuous form paper M on which the front print image G1 is printed is dried by the drying part 45A (Step S206).

The back image print data Dpb are transmitted to the control part 49B of the back surface printer 4B, and in the back surface printer 4B, the printing part 43B ejects ink on the basis of the back image print data Dpb, to thereby print the back print image G2 on the back surface Mb of the continuous form paper M (Step S207). Further, in the back surface printer 4B, the continuous form paper M on which the back print image G2 is printed is dried by the drying part 45B (Step S208). Thus, it is possible to obtain the continuous form paper M on which the front print image G1 is printed on the front surface Ma and the back print image G2 is printed on the back surface Mb.

In the embodiment described above, by printing the front print image G1 (the first image) on the front surface Ma (the first surface) of the continuous form paper M (web) and the back print image G2 (the second image) on the back surface Mb (the second surface) of the continuous form paper M, the double-sided printing is performed (printing process). Further, prior to the double-sided printing, printing of the test patterns Pt (the first and second test patterns) is performed (scaling adjustment value preparation process). In detail, the test pattern Pt (the first test pattern) is printed on the front surface Ma of the continuous form paper M and then drying is performed, and further the test pattern Pt (the second test pattern) is printed on the back surface Mb of the continuous form paper M and then drying is performed. At that time, the front pickup image I1 (the first pickup image) is acquired by imaging the front surface Ma on which the test pattern Pt is printed, and the back pickup image I2 (the second pickup image) is acquired by imaging the back surface Mb on which the test pattern Pt is printed. Furthermore, the ratio of the pattern width Wp1 (the first size) of the test pattern Pt on the front surface Ma to the paper width Wm1 of the continuous form paper M, i.e., Wp1/Wm1 (the first ratio) is obtained on the basis of the front pickup image I1. Further, the ratio of the pattern width Wp2 (the second size) of the test pattern Pt on the back surface Mb to the paper width Wm2 of the continuous form paper M, i.e., Wp2/Wm2 (the second ratio) is obtained on the basis of the back pickup image I2.

In other words, the ratios (Wp1/Wm1, Wp2/Wm2) of the pattern widths Wp1, Wp2 to the paper widths Wm1, Wm2 are obtained, respectively, after the first drying and after the second drying (Step S109). Then, in accordance with these ratios, a range (in other words, the width) in which the back print image G2 is to be printed is adjusted in the width direction Aw (Step S204). As a result, when the double-sided printing is performed on the continuous form paper M by performing drying every time when the image is printed on each of the surfaces Ma, Mb of the continuous form paper M, it is possible to suppress the difference in the ratios of the widths of the images G1, G2 to the width of the continuous form paper M between the surfaces Ma and Mb of the continuous form paper M.

Particularly, the control part 49A of the front surface printer 4A calculates the scaling value which allows the ratio (Wg1/Wm1) of the image width Wg1 to the paper width Wm1 after drying using the drying part 45 (the first drying part) of the front surface printer 4A and the ratio (Wg2/Wm2) of the image width Wg2 to the paper width Wm2 after drying using the drying part 45 of the back surface printer 4B to coincide with each other. Further, the image processing part 92 adjusts the width of the image indicated by the back image print data Dpb on the basis of the calculated scaling value and adjusts a print range of the back print image G2 so that these ratios should coincide with each other, and can thereby reliably suppress the difference in the ratios of the widths of the images G1, G2 to the width of the continuous form paper M between the surfaces Ma and Mb of the continuous form paper M.

Further, the image processing part 92 transmits the test print data Dt (test data) which are data indicating the test pattern Pt to the front surface printer 4A and the back surface printer 4B. Then, the front surface printer 4A prints the test pattern Pt on the front surface Ma in accordance with the test print data Dt, and the back surface printer 4B prints the test pattern Pt on the back surface Mb in accordance with the test print data Dt. In such a configuration, the test pattern Pt on the front surface Ma and the test pattern Pt on the back surface Mb are printed on the basis of the same test print data Dt. Therefore, it is possible to suppress the difference between the test pattern Pt on the front surface Ma and the test pattern Pt on the back surface Mb from being caused by any factor other than the expansion or contraction of the continuous form paper M. In other words, the influence of the expansion or contraction of the continuous form paper M can be precisely reflected on the difference between the test pattern Pt on the front surface Ma and the test pattern Pt on the back surface Mb. As a result, it is possible to reliably suppress the difference in the ratios of the widths of the front print images G1, G2 to the width of the continuous form paper M between the surfaces Ma and Mb of the continuous form paper M.

Furthermore, the test pattern Pt printed on each of the front surface Ma and the back surface Mb has the plurality of marks Kt (the first and second marks) arranged in the width direction Aw. Then, the control part 49A obtains the distance in the width direction Aw of the two marks Kt positioned at both the ends, among the plurality of marks Kt (the first marks) included in the front pickup image I1, as the pattern width Wp (the first size) and obtains the distance in the width direction Aw of the two marks Kt positioned at both the ends, among the plurality of marks Kt (the second marks) included in the back pickup image I2, as the pattern width Wp2 (the second size). In such a configuration, by simple calculation of obtaining the distance of the two marks Kt in the width direction Aw, it is possible to obtain the pattern widths Wp1 and Wp2 reflecting the respective sizes of the test patterns Pt on the front surface Ma and the back surface Mb.

Further, the control part 49A obtains the distance (the one-side offset Or1, the other-side offset Ol1) between the test pattern Pt on the front surface Ma and the end of the continuous form paper M in the width direction Aw on the basis of the front pickup image I1. Moreover, the control part 49A obtains the distance (the one-side offset Or2, the other-side offset Ol2) between the test pattern Pt on the back surface Mb and the end of the continuous form paper M in the width direction Aw on the basis of the back pickup image I2. Then, in accordance with the difference of these distances, the position of the back print image G2 in the width direction Aw is adjusted. In such a configuration, it is possible to print the images G1, G2 on the surfaces Ma, Mb of the continuous form paper M while suppressing not only the difference in the ratios of the widths of the images G1, G2 to the width of the continuous form paper M, but also the position deviation between the images G1 and G2 in the width direction Aw of the continuous form paper M.

In the above-described embodiment, the continuous paper printer 1 corresponds to one example of a "web printing apparatus" of the present invention, the printing part 43 of the front surface printer 4A corresponds to one example of a "first printing part" of the present invention, the drying part 45 of the front surface printer 4A corresponds to one example of a "first drying part" of the present invention, the printing part 43 of the back surface printer 4B corresponds to one example of a "second printing part" of the present invention, the drying part 45 of the back surface printer 4B corresponds to one example of a "second drying part" of the present invention, the image pickup part 47 of the front surface printer 4A corresponds to one example of a "first image pickup part" of the present invention, the image pickup part 47 of the back surface printer 4B corresponds to one example of a "second image pickup part" of the present invention, the control part 49A, the control part 49B, the data generation part 91, and the image processing part 92 function in cooperation as one example of a "control part" of the present invention, the width direction Aw corresponds to one example of a "width direction" of the present invention, the print head Bh of the front surface printer 4A corresponds to one example of a "first head" of the present invention, the print head Bh of the back surface printer 4B corresponds to one example of a "second head" of the present invention, the test print data Dt correspond to one example of "test data" of the present invention, the mark Kt printed on the front surface Ma corresponds to one example of a "first mark" of the present invention, the mark Kt printed on the back surface Mb corresponds to one example of a "second mark" of the present invention, the front print image G1 corresponds to one example of a "first image" of the present invention, the back print image G2 corresponds to one example of a "second image" of the present invention, the front pickup image I1 corresponds to one example of a "first pickup image" of the present invention, the back pickup image I2 corresponds to one example of a "second pickup image" of the present invention, the continuous form paper M corresponds to one example of a "web" of the present invention, the front surface Ma corresponds to one example of a "first surface" of the present invention, the back surface Mb corresponds to one example of a "second surface" of the present invention, the test pattern Pt printed on the front surface Ma corresponds to one example of a "first test pattern" of the present invention, the test pattern Pt printed on the back surface Mb corresponds to one example of a "second test pattern" of the present invention, the pattern width Wp1 corresponds to one example of a "first size" of the present invention, the pattern width Wp2 corresponds to one example of a "second size" of the present invention, Wp1/Wm1 corresponds to one example of a "first ratio" of the present invention, and Wp2/Wm2 corresponds to one example of a "second ratio" of the present invention.

Further, the present invention is not limited to the above-described embodiment, but numerous modifications and variations other than those described above can be devised without departing from the scope of the invention. For example, the manner of selecting two marks Kt out of the plurality of marks Kt included in the test pattern Pt may be changed as appropriate.

Figure 8:
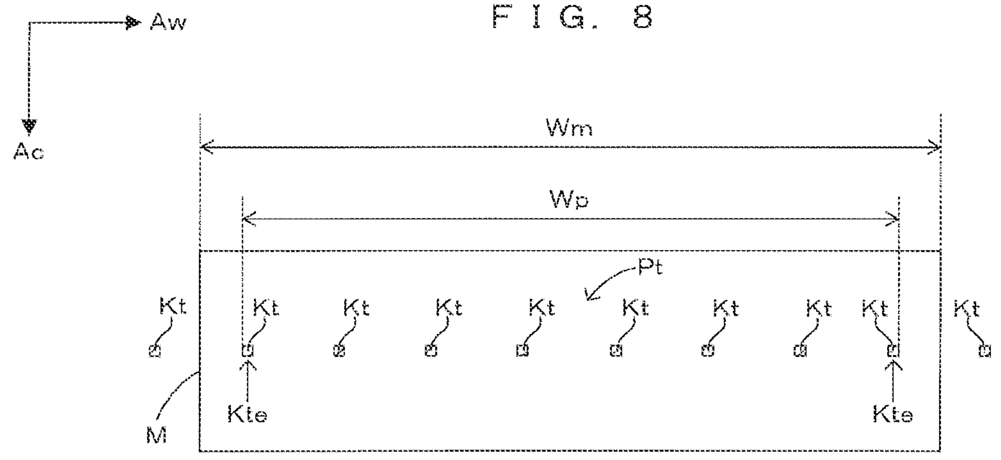
FIG. 8 is a view schematically showing a variation of a manner of selecting a plurality of marks included in a test pattern.

FIG. 8 is a view schematically showing a variation of the manner of selecting a plurality of marks included in the test pattern. In the exemplary case of FIG. 8, the paper width Wm of the continuous form paper M on which printing of the front print image G1 and the back print image G2 is planned in the printing process is changed from the paper width Wm of the continuous form paper M on which the test pattern Pt is printed in the scaling adjustment value preparation process. As a result, some (at both the ends) of the plurality of marks Kt forming the test pattern Pt do not fall within the paper width Wm of the continuous form paper M. In such a case, the image processing part 92 adopts a distance in the width direction Aw of the two marks Kt (the second marks Kte from both the ends) positioned at both ends in a range within the paper width Wm of the continuous form paper M to be used in the printing process, as values (the first size and the second size) reflecting the size of the test pattern Pt.

Specifically, among the plurality of marks Kt, the distance of the marks Kte positioned at the second positions from both ends of the front pickup image I1 in the width direction Aw is acquired as the pattern width Wp1 (the first size). Further, the distance of the marks Kte positioned at the second positions from both ends of the back pickup image I2 in the width direction Aw is acquired as the pattern width Wp2 (the second size). Then, the scaling value is calculated on the basis of these pattern widths, and the scaling adjustment (Step S204) is performed in the printing process. In such a configuration, it is possible to suppress the difference in the ratios of the widths of the front print images G1 and G2 to the width of the continuous form paper M between the surfaces Ma and Mb of the continuous form paper M while precisely dealing with the change in the width of the continuous form paper M. Furthermore, in order to reliably perform such a control, it is suitable that the test pattern Pt should have more than 3 or 4 marks Kt.

Figure 9:
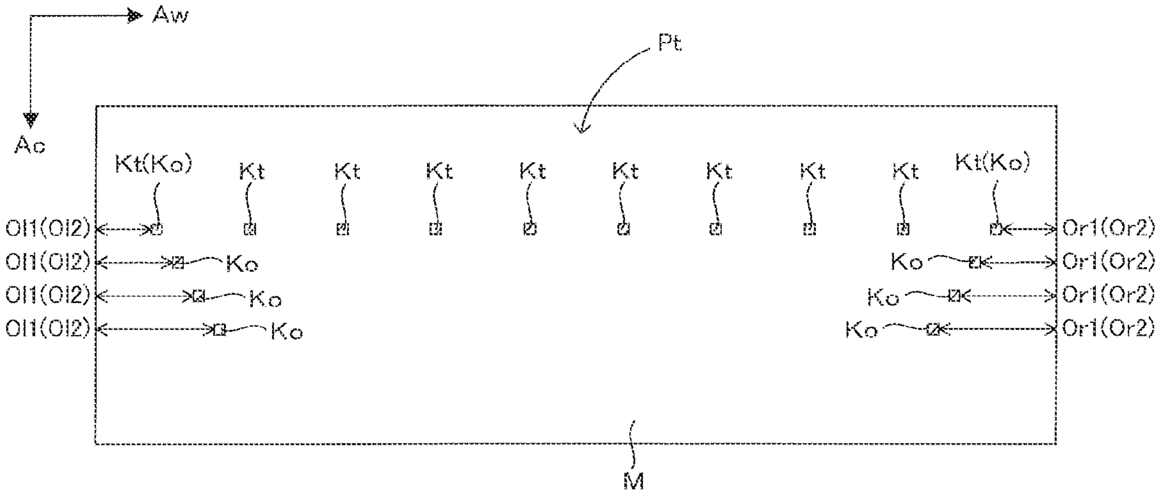
FIG. 9 is a view schematically showing a variation of a control to deal with offset deviation.

Further, the specific method for the control to deal with the offset deviation may be changed as appropriate. FIG. 9 is a view schematically showing a variation of the control to deal with the offset deviation. In the variation of FIG. 9, the test pattern Pt has a plurality of (four) offset marks Ko arranged in the transfer direction Ac (orthogonal direction). Respective positions of these offset marks Ko in the width direction Aw are different from one another, and in other words, the distance in the width direction Aw between the offset mark Ko and the end of the continuous form paper M differs depending on each of the offset marks Ko. The test pattern Pt has the plurality of offset marks Ko at each of both the ends in the width direction Aw. Furthermore, among the plurality of marks Kt, the marks Kt positioned at both the ends also each have the function as the offset mark Ko.

The control part 49A obtains the offset which is the distance between the offset mark Ko and the end of the continuous form paper M, for each of the plurality of offset marks Ko. Therefore, on the one side of the width direction Aw, the plurality of one-side offsets Or1 are obtained on the basis of the front pickup image I1, and the plurality of one-side offsets Ol2 are obtained on the basis of the back pickup image I2. Then, with respect to a combination of the one-side offset Or1 and the one-side offset Ol2 corresponding to the same mark Kt, the offset deviation ΔOr (=Or1−Ol2) is calculated. This offset deviation ΔOr is calculated for each of four combinations. An average value of the calculated four offset deviations ΔOr is obtained as an average offset deviation ΔOrv (Step S110). Further, similarly, on the other side of the width direction Aw, an average value of the four offset deviations ΔOl is obtained as an average offset deviation ΔOlv (Step S110).

Furthermore, as described above, the front pickup image I1 and the back pickup image I2 have different widths of the continuous form papers M, due to the influence of drying. In FIG. 9, however, the change in the width of the continuous form paper M is not shown for the purpose of collectively showing the one-side offset Or1, the one-side offset Or2, the other-side offset Ol1, and the other-side offset Ol2.

After the scaling adjustment value preparation process is thus completed, in Step S204 of the printing process, the offset adjustment is performed on the basis of the average offset deviation (adjustment value). In other words, in the width direction Aw, the back print image G2 is shifted with respect to the front print image G1 in the width direction Aw by using ΔOrv as the offset value when the reference of image data is on the Or side, or by using ΔOlv as the offset value when the reference of the image data is on the Ol side. Then, in accordance with this offset value, the position of the image indicated by the back image print data Dpb is shifted in the width direction Aw. In such a configuration, it is possible to print the images G1, G2 on both the surfaces Ma, Mb of the continuous form paper M while reliably suppressing the position deviation between the images G1, G2 in the width direction Aw of the continuous form paper M.

Further, any variation other than the variations shown in FIGS. 8 and 9 may be added as appropriate. In the above-described embodiment, for example, the control is made so that the ratios Wg1/Wgm1 and Wg2/Wgm2 should coincide with each other. When there is an improvement as compared with the scaling value calculated in the scaling adjustment value preparation process, however, it is determined that a certain effect is produced. In other words, the following inequality has only to hold:

$$\text{scaling value} > |(Wg1/Wm1)/(Wg2/Wm2)-1|$$

Furthermore, in the above-described embodiment, the scaling adjustment and the offset adjustment are performed on the back image print data Dpb (Step S204). If the scaling adjustment and the offset adjustment are performed on the front image print data Dpa, however, the same effect can be produced. In short, these adjustments have only to be performed on at least one of the front image print data Dpa and the back image print data Dpb. Moreover, target data of the scaling adjustment and that of the offset adjustment may differ between the front image print data Dpa and the back image print data Dpb.

Further, the test pattern Pt for the front surface Ma and the test pattern Pt for the back surface Mb do not need to be printed on the basis of the same test print data Dt, but may be printed on the basis of different pieces of test print data Dt.

Furthermore, the specific formation of the test pattern Pt may be changed as appropriate. Therefore, the number of marks Kt included in the test pattern Pt may be two. Alternatively, the test pattern Pt may be formed of one rod-like mark provided extending in parallel with the width direction Aw. Moreover, part of an image to be printed in the printing process may be printed as the test pattern Pt.

Further, the material of the web does not need to be paper but may be a film.

INDUSTRIAL APPLICABILITY

The present invention can be applied to a general technique for printing an image on both surfaces of a web.

REFERENCE SIGNS LIST

1 . . . continuous paper printer (web printing apparatus)
4A . . . front surface printer
4B . . . back surface printer
43 . . . printing part (first printing part, second printing part)
45 . . . drying part (first drying part, second drying part)
47 . . . image pickup part (first image pickup part, second image pickup part)
49 . . . control part (control part)
91 . . . data generation part (control part)
92 . . . image processing part (control part)

The invention claimed is:

1. A web printing apparatus, comprising:
a first printing part that prints a first image on a first surface of a web having a width in a width direction;
a first drying part that dries the web by heating the web on which the first image is printed by the first printing part;
a second printing part that prints a second image on a second surface opposite to the first surface of the web dried by the first drying part;
a second drying part that dries the web by heating the web on which the second image is printed by the second printing part;
a first image pickup part that images the first surface of the web after being dried by the first drying part and before being dried by the second drying part;
a second image pickup part that images the second surface of the web after being dried by the second drying part; and
a control part that prints a first test pattern on the first surface by the first printing part and prints a second test pattern on the second surface by the second printing part,
wherein the first image pickup part acquires a first pickup image by imaging the first surface on which the first test pattern is printed,
the second image pickup part acquires a second pickup image by imaging the second surface on which the second test pattern is printed, and
the control part obtains a first ratio indicating a ratio of a first size reflecting a size of the first test pattern in the width direction to the width of the web on the basis of the first pickup image, obtains a second ratio indicating a ratio of a second size reflecting a size of the second test pattern in the width direction to the width of the web on the basis of the second pickup image, and adjusts the width of at least one of the first image and the second image in the width direction in accordance with the first ratio and the second ratio.

2. The web printing apparatus according to claim 1, wherein the control part adjusts the width of at least one of the first image and the second image in the width direction so that a ratio of a width of the first image to a width of the web after being dried by the first drying part and before being dried by the second drying part and a ratio of a width of the second image to a width of the web after being dried by the second drying part coincide with each other.

3. The web printing apparatus according to claim 1, wherein the control part transmits test data which are data indicating a test pattern to the first printing part and the second printing part, the first printing part prints the first test pattern by printing an image indicated by the test data, and the second printing part prints the second test pattern by printing an image indicated by the test data.

4. The web printing apparatus according to claim 1, wherein the first test pattern has a plurality of first marks arranged in the width direction, the second test pattern has a plurality of second marks arranged in the width direction, and the control part obtains a distance of two first marks in the width direction, among the plurality of first marks included in the first pickup image, as the first size and obtains a distance of two second marks in the width direction, among the plurality of second marks included in the second pickup image, as the second size.

5. The web printing apparatus according to claim 4, wherein the control part obtains a distance in the width direction of two first marks positioned at both ends among the plurality of first marks, as the first size and obtains a distance in the width direction of two second marks positioned at both ends among the plurality of second marks, as the second size.

6. The web printing apparatus according to claim 4, wherein when the width of the web on which the first image and the second image are planned to be printed is changed from the width of the web on which the first test pattern and the second test pattern are printed, the control part obtains a distance in the width direction of two first marks positioned at both ends in a range within the changed width of the web, among the plurality of first marks, as the first size and obtains a distance in the width direction of two second marks positioned at both ends in a range within the changed width of the web, among the plurality of second marks, as the second size.

7. The web printing apparatus according to claim 4, wherein the first printing part has a plurality of first heads arranged in the width direction and ejects ink from the first heads, to thereby print the first image, the second printing part has a plurality of second heads arranged in the width direction and ejects ink from the second heads, to thereby print the second image, and the control part uses the plurality of first heads to print the plurality of first marks, respectively, by causing each of the plurality of first heads to eject ink and uses the plurality of second heads to print the plurality of second marks, respectively, by causing each of the plurality of second heads to eject ink.

8. The web printing apparatus according to claim 1, wherein the control part adjusts a position of at least one of the first image and the second image in the width direction in accordance with a difference between a distance of an end of the web and the first test pattern in the width direction which is obtained on the basis of the first pickup image and a distance of an end of the web and the second test pattern in the width direction which is obtained on the basis of the second pickup image.

9. The web printing apparatus according to claim 8, wherein the first test pattern has a plurality of first offset marks arranged in an orthogonal direction orthogonal to the width direction, the second test pattern has a plurality of second offset marks arranged in the orthogonal direction, corresponding to the plurality of first offset marks, respectively, a distance to the end of the web in the width direction differs depending on each of the plurality of first offset marks, a distance to the end of the web in the width direction differs depending on each of the plurality of second offset marks, and the control part adjusts a position of at least one of the first image and the second image in the width direction in accordance with an average value of a differences between a distance of the first offset mark and the end of the web and a distance of the corresponding second offset mark and the end of the web, the differences being calculated for respective combinations of the first offset marks and the corresponding second offset marks.

10. A web printing method comprising:

printing a first test pattern on a first surface of a web having a width in a width direction by a first printing part;

drying the web by using a first drying part to heat the web on which the first test pattern is printed by the first printing part;

printing a second test pattern, by a second printing part, on a second surface opposite to the first surface of the web dried by the first drying part;

drying the web by using a second drying part to dry the web on which the second test pattern is printed by the second printing part;

acquiring a first pickup image by imaging the web on which the first test pattern is printed, after being dried by the first drying part and before being dried by the second drying part;

acquiring a second pickup image by imaging the web on which the second test pattern is printed, after being dried by the second drying part;

obtaining a first ratio indicating a ratio of a first size reflecting a size of the first test pattern in the width direction to the width of the web on the basis of the first pickup image;

obtaining a second ratio indicating a ratio of a second size reflecting a size of the second test pattern in the width direction to the width of the web on the basis of the second pickup image;

adjusting a range in the width direction, in which at least one of a first image and a second image is printed in accordance with the first ratio and the second ratio;

printing the first image on the first surface of the web by the first printing part;

drying the web by using the first drying part to heat the web on which the first image is printed by the first printing part;

printing the second image on the second surface of the web which is dried by the first drying part; and drying the web by using the second drying part to dry the web on which the second image is printed by the second printing part.

* * * * *